United States Patent Office 2,782,226
Patented Feb. 19, 1957

2,782,226

PRODUCTION OF HYDRACRYLIC ACID ESTERS

Marius Séon, Montreuil-sous-Bois, and Jean Leleu, Aulnay-sous-Bois, France, assignors to Pechiney Compagnie de Produits Chimiques et Electrometallurgiques, Paris, France, a corporation of France No Drawing. Application May 4, 1954,
Serial No. 427,650

Claims priority, application France May 7, 1953

7 Claims. (Cl. 260—484)

This invention relates to the production of hydracrylic acid esters and, more particularly, to the production of such esters from ethylene oxide, carbon monoxide and water.

We have found that under certain conditions carbon monoxide is capable of reacting with ethylene oxide to from, with a good yield, monothylene glycol hydracrylate according to the following composite reaction:

$$CO + 2CH_2\!\!-\!\!\!\underset{O}{\overset{}{\diagdown\!\!\diagup}}\!\!\!-\!\!CH_2 + H_2O \longrightarrow$$

$$OH\!-\!CH_2\!-\!CH_2\!-\!CO_2\!-\!CH_2\!-\!CH_2OH \quad (1)$$

We do not wish to be bound by any specific theory of reaction for the exact mechanism of this reaction has not been proven with certainty. However, by analogy with the well known reaction between carbon monoxide and tetrahydrofurane that leads to delta valerolactone:

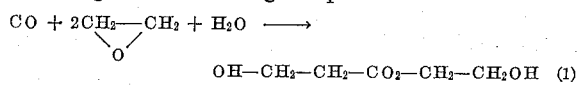
(2)

it may be assumed that the reaction which is the object of the present invention occurs in three stages:

(a) $CO + CH_2\!\!-\!\!\!\underset{O}{\overset{}{\diagdown\!\!\diagup}}\!\!\!-\!\!CH_2 \longrightarrow$

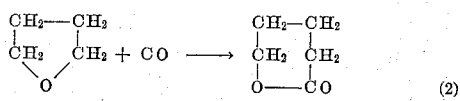 beta propiolactone (3)

(b) $\underset{\overset{|}{O}\!-\!\!\overset{|}{C}O}{CH_2\!-\!CH_2} + H_2O \longrightarrow \underset{\overset{|}{OH} \;\; \overset{|}{C}O_2H}{CH_2\!-\!CH_2}$ hydracrylic acid (4)

(c) 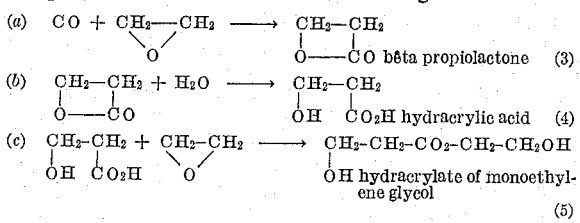
OH hydracrylate of monoethylene glycol
(5)

This recation does not take place in the absence of catalyst and the presence of water is likewise necessary. The most active catalyst is cobalt carbonyl. Speaking generally, all derivatives of cobalt catalyze the reaction because the cobalt carbonyl is formed in the reaction medium through the action of CO upon cobalt or upon its salts in the presence of water. The thusly reduced cobalt, finely divided or deposited on a support such as kieselguhr, is suitable since the formation of the cobalt carbonyl is rapid. The amount of catalyst used, expressed in percent of cobalt, relative to ethylene oxide, customarily is between about 1 and 5% but this proportion may vary in conformity with desired reaction velocities.

The reaction temperature used customarily is between about 60 and 100° C. but the preferred temperature is between about 70 and 75° C. The pressure of the reaction and the charged carbon monoxide is higher than atmospheric pressure. Of course, the velocity of the reaction increases as the pressure is increased and it reaches attractive values with pressures of about 100 to 200 kg. per cm.², i. e. about 100 to 200 atmospheres.

In accordance with a preferred practice, all of the ethylene oxide is reacted. Then the yield in monoethylene glycol hydracrylate amounts to 75 to 90% of the theoretical yield based upon the amount of ethylene oxide consumed in the reaction.

As we stated above, the speed of the reaction may be modified by the amount of catalyst used and, of course, by the reaction temperature and the reaction pressure. The reaction pressure customarily is induced by the addition of CO until the desired pressure is obtained.

We have found that the use of phenolic compounds, such as, for example, hydroquinone, also has a beneficial influence upon the speed of the reaction and, as a result, the presence of such compounds is advantageous in the industrial operation of the process.

In accordance with a special embodiment of this invention, the reaction may be effected in the presence of an alcohol. These alcohols are then partially transformed into corresponding hydracrylic esters. Particularly if the alcohol is glycol, the ester formed is ethylene glycol monohydracrylate which is the same compound obtained when ethylene oxide is used without the presence of any alcohol. The over-all reaction with ethylene oxide, carbon monoxide and ethylene glycol is believed to be as follows:

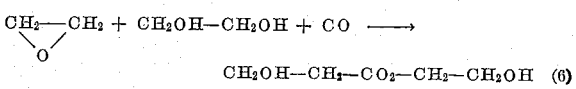

$$CH_2OH\!-\!CH_2\!-\!CO_2\!-\!CH_2\!-\!CH_2OH \quad (6)$$

This reaction never occurs alone, it always goes hand in hand with reaction 1.

In the case where alcohols such as methanol, ethanol, etc. are used, their corresponding hydracrylates are obtained in addition to the glycol hydracrylate. Depending upon the conditions of the operation, the respective ratios of these esters may be varied widely.

The reactions of this invention may be effected in the presence of alcohols other than mono- and dihydric alcohols mentioned hereinbefore, such as those the molecule of which contains one to thirteen carbon atoms.

From monoethylene glycol hydracrylate a series of hydracrylic derivatives may be easily obtained. Thus, by trans esterification other hydracrylic esters, such as methyl, ethyl, etc. hydracrylates can easily be prepared.

In accordance with known reaction procedures hydracrylamide may be obtained from the products of this invention with good yields by the action of ammonia.

These so obtained hydracrylic derivatives may often be used as intermediates for the production, in good yields, of the corresponding acrylic derivatives. For example, methyl and ethyl hydracrylates give methyl and ethyl acrylates by dehydration and hydracrylamide may be converted to acrylonitrile. These instances merely illustrate the possible uses of the products of this invention.

The following examples will serve to facilitate an understanding of the invention and also serve to further illustrate the invention but they are not to be considered limitations upon the invention.

Example 1

The following ingredients are introduced into a stainless steel one-liter autoclave:

150 g. of ethylene oxide
50 g. of water
21 g. of catalyst

The catalyst is obtained by the deposition of reduced cobalt on kieselguhr. The kieselguhr contains 13% of cobalt.

The autoclave is thoroughly purged and a pressure of 110 kg./cm.² is established therein by charging the autoclave with cabron monoxide.

The temperature is raised up to 70° C. and then kept at this value. The absorption of carbon monoxide lasts about 20 hours and the pressure falls to 48 kg./cm.$^2$.

After removing the carbon monoxide the liquid product contained in the autoclave is filtered and freed by distilling from water and ethylene oxide which has not been transformed. Eighteen g. of ethylene oxide are recovered and there are obtained 155 g. of a light brown oil having the saponification number of 405, which corresponds to a purity of 97% of monoethylene glycol hydracrylate. The yield is 74% of the theoretical yield based upon the amount of ethylene oxide consumed in the condensation.

*Example 2*

Within a stainless steel autoclave of 1 liter, provided with a stirring device, there are placed:

100 g. of ethylene oxide
41 g. of water
20 g. of cobalt catalyst, the same as in Example 1
0.2 g. of hydroquinone The autoclave is thoroughly purged and charged with carbon monoxide up to 100 kg./cm.$^2$. The temperature is raised to 70° C. and then kept at this value. The absorption of carbon monoxide lasts about five hours. Now it is operated as in Example 1. One to two g. of ethylene oxide, which did not react, are recovered. One hundred g. of light brown oil are obtained having a saponification number of 413 constituting monoethylene glycol hydracrylate of 99 percent of purity. The yield is 74.5% of the theoretical yield based upon the amount of ethylene oxide consumed in the reaction.

*Example 3*

In the same autoclave as in Example 2 there are placed:

50 g. of water
20 g. of catalyst obtained by the deposition of 3 gr. cobalt carbonate on kieselguhr.

The autoclave is purged with carbon monoxide and a pressure of 90 kg./cm.$^2$ of carbon monoxide is established therein. The action mass is heated for three hours and thirty minutes at 100° C. Carbon monoxide is discharged after cooling the autoclave. The autoclave, the interior of which is covered with orange-brown crystals of cobalt carbonyl, is opened and charged with:

100 g. of ethylene oxide
0.2 g. of hydroquinone

Carbon monoxide is again introduced into the autoclave until a pressure of 90 kg./cm.$^2$ is reached and it is then heated to 70° C. The absorption of carbon monoxide starts as soon as the temperature has reached 65° C. Absorption of carbon monoxide ended after three hours. The remaining operations are the same as those in Example 1. There are obtained 139 g. of dark-rose oil from which 6 to 7 g. of cobalt hydracrylate settle after the reaction mass is cooled in the form of a pink fine precipitate. The oil separated from this precipitate is yellow; it has a saponification number of 415 instead of 417 theoretically corresponding to glycol hydracrylate. The yield is 90% of the theoretical yield based upon the amount of ethylene oxide consumed in the reaction.

*Example 4*

Cobalt carbonyl is prepared as in Example 3 and there are introduced into the autoclave:

150 g. of ethylene glycol
50 g. of ethylene oxide
0.2 of hydroquinone

A pressure of 100 kg./cm.$^2$ is established by an addition of carbon monoxide and the autoclave is heated to 75° C. The absorption of carbon monoxide starts very quickly and it lasts about two to three hours. After separating the catalyst by filtration and subsequently discarding water and glycol by distillation, 100 g. of monoethylene glycol hydracrylate are obtained, which have a purity of 95 to 98%.

The monoethylene glycol monohydracrylate disclosed hereinbefore has the following physical characteristics:
1. It is an oily liquid, non-distillable even in vacuum.
2. Its specific gravity at 18° C. is 1.224.
3. Its refractive index at 19° C. for a wave length of 5.893 A. is 1.460.

It should be understood that the present invention is not limited to the specific illustrative details set forth herein except where otherwise indicated and that it extends to all equivalents which will occur to those skilled in the art upon consideration of the scope of the claims appended hereto.

What is claimed is:

1. A process for producing monoethylene glycol hydracrylate, which comprises producing a hydracrylic acid ester by reacting ethylene oxide, carbon monoxide and water in the presence of a cobalt carbonyl catalyst under superatmospheric carbonylating pressures and at reaction temperatures of the order of 100° C. and below.

2. A process for producing monoethylene glycol hydracrylate which comprises producing a hydracrylic acid ester by reacting under heating at a temperature of about 60–100° C. at superatmospheric pressure of about 90 to 200 atmospheres ethylene oxide, carbon monoxide and water in the presence of cobalt carbonyl.

3. A process for producing monoethylene glycol hydracrylate, which comprises producing a hydracrylic acid ester by reacting under heating at a temperature of about 60–100° C. at carbonylating superatmospheric pressure ethylene oxide, carbon monoxide and water in the presence of cobalt carbonyl hydride formed in situ by the reduction of a compound of cobalt.

4. A process for producing mixed mono-esters of hydracrylic acid which comprises producing a hydracrylic acid ester by reacting under heating at a temperature of about 60 to 100° C. and at carbonylating superatmospheric pressure ethylene oxide, carbon monoxide and water in the presence of cobalt carbonyl and an alcohol, selected from the group consisting of ethylene glycol and low molecular weight monohydric alkanols.

5. A process for producing monoethylene glycol hydracrylate, which comprises producing said acrylate by reacting under heating at about 60–100° C. at carbonylating superatmospheric pressure ethylene oxide, carbon monoxide and water in the presence of cobalt carbonyl and ethylene glycol.

6. A process for producing mixed mono-esters of hydracrylic acid, which comprises producing said mixed esters by reacting under heating at temperatures of about 60–100° C. at carbonylating superatmospheric pressure ethylene oxide, carbon monoxide and water in the presence of cobalt carbonyl and a low molecular weight monohydric alkanol.

7. A process for producing monoethylene glycol hydracrylate, which comprises producing a hydracrylic acid ester by reacting under heating at a temperature of about 60 to 100° C. and at carbonylating superatmospheric pressure ethylene oxide, carbon monoxide and water in the presence of cobalt carbonyl and hydroquinone.

References Cited in the file of this patent

UNITED STATES PATENTS

| 2,445,731 | Caldwell | Dec. 7, 1948 |
| 2,553,564 | Fein et al. | May 22, 1951 |
| 2,587,858 | Keulmans | Mar. 4, 1952 |

FOREIGN PATENTS

| 667,824 | Great Britain | Mar. 5, 1952 |

OTHER REFERENCES

Reppe: "Acetylene Chemistry" (1949), p. 177, published by Meyer & Co., New York City, N. Y.